United States Patent [19]

McColl et al.

[11] Patent Number: 4,706,789
[45] Date of Patent: Nov. 17, 1987

[54] STARTING CLUTCH ASSEMBLY FOR A CONTINUOUSLY VARIABLE TRANSMISSION

[75] Inventors: John W. McColl, Broadview; Philip J. Mott, Des Plaines; Ralph D. Salle, Lake Zurich, all of Ill.

[73] Assignee: Borg-Warner Automotive, Inc., Troy, Mich.

[21] Appl. No.: 750,206

[22] Filed: Jul. 1, 1985

[51] Int. Cl.$^4$ .................. F16D 25/04; F16D 25/063; F16D 13/74
[52] U.S. Cl. .................. 192/0.075; 192/0.076; 192/70.12; 192/70.28; 192/85 AA; 192/106 F; 192/113 B
[58] Field of Search ............... 192/0.052, 0.07, 0.075, 192/70.12, 70.2, 70.28, 85 AA, 89 B, 106 F, 113 B, 113 A, 0.076

[56] References Cited

U.S. PATENT DOCUMENTS

| | | | |
|---|---|---|---|
| 940,679 | 11/1909 | Evans | 192/70.28 X |
| 2,073,146 | 3/1937 | Gardiner | 192/89 B X |
| 2,756,851 | 7/1956 | Collins | 192/0.052 |
| 2,876,743 | 3/1959 | Maki | 192/85 AA X |
| 2,966,978 | 1/1961 | Kaptur | 192/106 F |
| 3,213,984 | 10/1985 | Cook | 192/85 AA X |
| 3,217,851 | 11/1965 | Mogk et al. | 192/106 F X |
| 3,236,349 | 2/1966 | Wiggins et al. | 192/85 AA X |
| 3,301,142 | 1/1967 | Cenko | 192/85 AA |
| 3,602,347 | 8/1971 | Yamaguchi | 192/85 AA X |
| 3,647,037 | 3/1972 | Toma | 192/85 AA X |
| 3,747,731 | 7/1973 | Smirl | 192/104 R |
| 3,765,514 | 10/1973 | Harrison | 192/85 AA |
| 4,014,619 | 3/1977 | Good et al. | 403/359 |
| 4,520,912 | 6/1985 | Ferris et al. | 192/85 AA |
| 4,560,048 | 12/1985 | Flotow et al. | 192/113 B X |

FOREIGN PATENT DOCUMENTS

| | | | |
|---|---|---|---|
| 223177 | 7/1959 | Australia | 192/89 B |
| 1047542 | 12/1958 | Fed. Rep. of Germany | 192/85 AA |
| 940405 | 10/1963 | United Kingdom | 192/85 AA |

OTHER PUBLICATIONS

U.S. Patent Application Ser. No. 685,682, filed Dec. 24, 1984—Ernest A. Ferris.
U.S. Patent Application Ser. No. 685,684, filed Dec. 24, 1984—John W. McColl.

*Primary Examiner*—Rodney H. Bonck
*Assistant Examiner*—David A. Testardi
*Attorney, Agent, or Firm*—James A. Geppert

[57] ABSTRACT

A hydraulically-actuated starting clutch adapted for a continuously variable transmission which is located at the output of the transmission to couple the vehicle wheels to the engine upon a signal from the throttle induced system oil pressure. The clutch includes a cover connected to the drive shaft through a hub forming a pressure chamber behind a piston, a Belleville spring acted upon by a pressure disc extending between the spring and the piston and urging a pressure plate against the clutch plate and an end plate secured in the cover, and retractor fingers on said pressure disc engaging said pressure plate. A cooling oil impeller is positioned between the end plate and a clutch plate hub and operatively connected to the end plate, and the clutch plate is operatively connected to a sleeve shaft to drive the differential for the vehicle wheels. Also, a balance cap is operatively connected onto the hub to form a balance chamber in front of the piston to receive oil and compensate for the centrifugal effect of the oil in the pressure chamber behind the piston.

11 Claims, 3 Drawing Figures

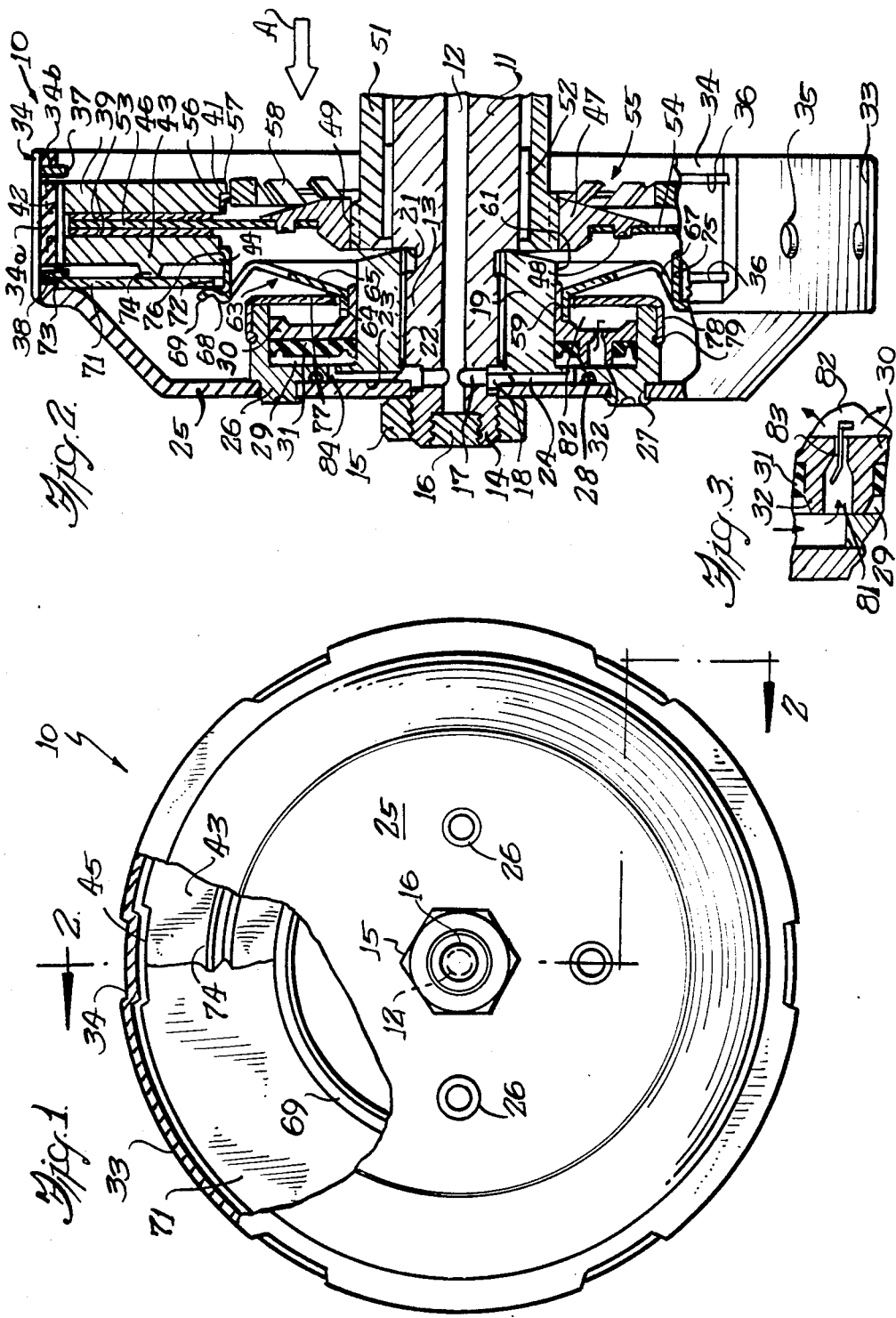

STARTING CLUTCH ASSEMBLY FOR A CONTINUOUSLY VARIABLE TRANSMISSION

BACKGROUND OF THE INVENTION

The present invention relates to a hydraulically-actuated starting clutch, and more specifically to a starting clutch assembly for a continuously variable transmission in an automotive vehicle. Continuously variable transmissions have been known for several years as a driving assembly between a vehicle engine and the road engaging wheels to provide smooth acceleration without the usual gear shifting found in most automatic transmissions. A continuously variable transmission includes a pair of variable sheave pulleys, an endless belt extending between and engaging the pulleys, and control means to alter the effective pulley diameters and thus change the belt ratio.

In automotive applications, it is necessary to incorporate a suitable clutch assembly in the drivetrain as a starting device and planetary gearing to effect desirable gear reduction and to provide for forward-neutral-reverse gear mechanisms. It is desirable to have the pulleys constantly rotating when the vehicle engine is running, even at idle rpm, so that initiation of vehicle movement is accomplished by a speed responsive friction starting device, such as a clutch, located at the output of the continuously variable transmission, and a forward-neutral-reverse mechanism is desirably located in conjunction with or subsequent to the starting device.

In a starting clutch where actuation is dependent upon hydraulic pressure acting on the clutch engaging elements and where circulating oil is utilized for cooling of the friction faces, the viscous drag resulting from the oil flowing between the clutch surfaces when the clutch is in its released state results in a condition where the clutch is not fully disengaged. Therefore, unwanted driving input to the transmission is present after release of the clutch. The undesirable vehicle "creep" that results often requires the use of a special brake in the system; an inefficient and costly extra. A possible solution to this problem is the strategic dumping of the cooling oil flowing to the clutch together with the clutch's ability to promptly respond.

Another problem resides in the resultant centrifugal force of hydraulic actuating fluid for a rotating clutch which provides liquid pressure that may influence actuation of the clutch piston in its chamber. Further problems include engine stalling during rapid vehicle braking and lack of smoothness of clutch engagement during acceleration of the vehicle. The present invention overcomes these various problems in the form of a novel simplified hydraulically-actuated starting clutch assembly.

SUMMARY OF THE INVENTION

The present invention comprehends the provision of a novel starting clutch arrangement, particularly for a continuously variable transmission, which is located at the output of the transmission to automatically couple the vehicle engine to the driving wheels upon a signal from the throttle induced system oil pressure. Where no throttle signal is present, the clutch will substantially completely disengage due to resilient members connected between the pressure plate and the inner edge of a Belleville spring to prevent vehicle creep due to viscous drag resulting from the cooling fluid present between the clutch engaging surfaces. A fluid impeller is positioned on a continuously rotating member adjacent the clutch plate to break up and disburse the cooling fluid to the clutch surfaces, especially where there is a locked-wheel stall condition when the clutch plate is stationary.

The present invention also comprehends the provision of a starting clutch in the form of a hydraulically-operated wey clutch including a Belleville spring to multiply the hydraulic force of the piston to be exerted on the clutch pressure plate. An annular balance cap or centrifugal shroud is secured to the hub and extends over the face of the piston to receive oil from a restricted passage in the piston and prevent the unwanted effects of hydraulic centrifugal "head" behind the piston in the assembly at speeds of the order of 12,000 rpm.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a front elevational view of the starting clutch of the present invention with portions broken away to show the internal clutch structure.

FIG. 2 is a partial cross sectional view of the clutch taken on the irregular line 2—2 of FIG. 1.

FIG. 3 is an enlarged isolated view of a fluid passage in the actuating piston shown in FIG. 2.

DESCRIPTION OF PREFERRED EMBODIMENT

Referring more particularly to the disclosure in the drawings wherein is shown an illustrative embodiment of the present invention, FIGS. 1 and 2 disclose a hydraulically-actuated starting wet clutch assembly 10 mounted on a driving secondary shaft 11 from a continuously variable transmission, such as illustrated in U.S. Pat. No. 4,241,618. A longitudinal bore 12 in shaft 11 communicates with a source of hydraulic pressure utilized for actuation of the secondary pulley (not shown) for a transmission, such as shown in copending U.S. patent application Ser. No. 685,684 filed Dec. 24, 1984.

The driving shaft 11 terminates in a stepped portion 13 having a reduced threaded end 14 receiving an internally threaded nut 15; the shaft passage 12 being plugged at 16 and communicating with a plurality of generally radial feed holes or passages 17 opening into an annular groove 18. A substantially annular hub 19 is received on the reduced end portion 13 abutting the shoulder 21 defining the end portion and secured by splined connection 22 to rotate with the constantly rotating driving shaft 11. The flat hub face 23 is provided with a plurality of radial grooves or passages 24 formed in the face to receive fluid from the groove 18. The nut 15 urges a clutch cover 25 against the hub 19 and likewise urges the hub against the shoulder 21. A plurality of circumferentially spaced axial projections 26 are received in aligned openings 27 in the cover 25, with the ends of the projections being headed to secure the hub and cover together. A ring seal 28 is provided in a groove in the hub face 23 within the projections 26 and an annular pressure chamber 29 formed in the hub facing away from the cover accommodates an axially movable annular piston 30 secured to an annular resilient seal 31 having lips engaging the inner and outer walls of the pressure chamber 29; two or more axial projections 32 on said piston extending through openings in the seal 31 to secure the members together. The cover has an outer axially extending flange 33 provided with internal flattened ribs 34 (FIG. 1), and openings 35 are provided in the cover flange to allow outward flow of cooling fluid therefrom. The ribs 34 are formed by stamping and piercing portions 34a and 34b which results in forming grooves 36 receiving snap rings 37 and 38.

An end plate 39 has an inner lipped surface 41 and an outer periphery with axial channels or grooves 42 (FIG. 2) formed therein to receive the indented ribs 34 so as to rotate with the cover. The snap ring 37 is positioned in the interrupted groove 36 in the ribs 34 to retain the end plate in the cover. Also, an axially movable annular pressure plate 43 has an inner lip 44 and the outer periphery has axial channels 45 (FIG. 1) formed therein receiving the ribs 34. Between the end plate 39 and the pressure plate 43 is positioned a clutch plate 46 secured to a powdered metal hub 47 through projections 48 formed on the hub and received in aligned openings in the clutch plate and headed over. The hub 47 is internally splined at 49 to receive the splined end of a sleeve or driven shaft 51 encompassing the shaft 11 and rotatably mounted on bearings 52; the sleeve shaft 51 acting to drive the vehicle wheels through a suitable differential (not shown).

The clutch plate includes a pair of oppositely disposed friction facings 53,53 formed preferably of a non-asbestos, high coefficient of friction material that is adhesively bonded to the clutch plate 46. The facings are provided with waffle grooving and feeder slots cut into the lining to allow for high cooling oil flow through the clutch at low back pressure. The cooling oil can flow through perforations 54 (FIG. 2) in the clutch plate 46 so as to cool both surfaces of the plate. Oil is encouraged to flow into the clutch assembly (arrow A) by an impeller 55 having an axial flange 56 received on the lipped surface 41 of the end plate 39 and positioned by the lip 57. The impeller is provided with a plurality of radially inwardly extending angled vanes 58.

The face of the piston 30 has an inner annular flange 59 extending along the hub surface 61 and provided with a recess to receive the inner axial flange 64 of an annular pressure disc 63. The pressure disc includes a generally conical surface 65 merging into an oppositely inclined surface 67 by a rounded joint. The surface extends toward the cover 25 and outwardly into a rounded surface 68 terminating in a curled edge 69 engaging adjacent the inner edge 72 of a Belleville spring 71. The periphery of the spring is positioned between a shoulder 73 formed in the corner of the cover 25 and the second snap ring 38 received in the interrputed groove 36 in the cover to provide a fulcrum surface for the spring.

The surface of the pressure plate 43 facing the Belleville spring 71 has an intermediate annular fulcrum ridge 74 to engage the approximate mid-point of the Belleville spring between the inner edge 72 and the periphery thereof. Also, a plurality of resilient fingers 75 are stamped out of the pressure disc 63 to axially extend inside the inner edge 72 of the Belleville spring and the inner lip 44 of pressure plate 43 to terminate in outwardly extending ends 76 projecting behind the lip 44. The fingers are circumferentially equally spaced around the pressure disc and act to retract the pressure plate 43 upon retraction of the piston 30 and Belleville spring 71.

Also, a generally annular balance cap 77 has an axial outer flange 78 with a lip 79 that is snapped over the periphery of the hub 19 to substantially cover the open end of a balance chamber 82. The balance cap extends over the substantial inner face of the piston 30 to a point adjacent the flange 64 of the pressure dsc 63. At least one of the projections 32 on the piston contains the passage 81 communicating from the pressure chamber 29 to a balance chamber 82 behind the balance cap 77. The passage 81 has a wire 83 (FIG. 3) therein to limit flow of fluid from the pressure chamber 29 to the balance chamber 82.

A throttle-induced hydraulic fluid pressure is supplied from a pump (not shown) in the vehicle drive system through the longitudinal bore 12 communicating with the radial passages 17 and 24 to enter the pressure chamber 29 through openings 84 in the hub 19 and actuate the piston 30. Also, the complete assembly 10 has a housing (not shown) encompassing the assembly, and a source of cooling fluid (oil) is available at the righthand end of the assembly as shown by arrow A in FIG. 2 to cool the friction surfaces of the clutch plate, pressure plate and end plate; the pressure plate 43 and end plate 39 both being relatively thick to provide an adequate heat sink to handle short but high-powered clutch engagements. As the variable transmission pulleys are accelerated from idle rpm, the fluid pump increases the hydraulic pressure applied through bore 12 to the pressure chamber 29 to urge the piston 30 to the right, as seen in FIG. 2; and urge the pressure disc 63 to engage and actuate the edge 72 of the Belleville spring 71. The spring pivots at the shoulder 73 and snap ring 38 and delivers force through the fulcrum 74 of the pressure plate 43 to urge the pressure plate towards the friction clutch plate 46 to engage the end plate 39 and cause rotation of the sleeve shaft 51 to drive the vehicle wheels upon being coupled to rotation of the driving shaft 11.

The Belleville spring is so proportioned as to prevent clutch engagement until a predetermined piston pressure is developed as a consequence of throttle advance; which system allows for "clunk-free" shifts from neutral to drive and from neutral to reverse. The spring rate of the Belleville spring has been set so that 8 psi. of throttle pressure increase is required to get the piston from full "off" position to "just causing torque" position. This is to guarantee clean and responsive slow speed vehicle maneuvering in garages and in parking sequences. The balance cap 77 provides a chamber 82 to allow oil entering through the passage 81 to reside and substantially balance the oil in chamber 29 and thus prevent medium speed hydraulic "head" in the apply cylinder 29 from spoiling the proper linear relationship of clutch torque versus secondary sheave torque. It is difficult to keep the clutch capacity in its proper relationship to the transmission belt capacity for the pulleys if centrifugal hydraulic forces are allowed to interfere.

The Belleville spring serves the following functions:
(1) It acts as a return spring for the piston.
(2) It multiplies the piston force by a factor of approximately 2 to 1.
(3) It imposes the clutch engaging force at about the radial mid-point of the friction members.
(4) It provides for a cushioning effect during clutch engagement enhancing shift smoothness due to the springiness of the spring.
(5) It determines the pressure for engagement of the clutch.

When the operator releases the throttle during operation of the vehicle, the hydraulic pressure rapidly decreases and the Bellevelle spring 71, in conjunction with the resilient fingers 75 acts to retract the pressure plate 43 and the piston 30 and disengage the clutch plate sufficiently cleanly to minimize open clutch drag and vehicle creep. Located on the secondary (output) shaft 11, the clutch is so sized as to always slip before the belt can slip. The clutch is supplied with fluid pressure through the bore 12 in the secondary shaft 11 with the oil at secondary sheave pressure; thus it is always "aware" of the secondary sheave's condition.

The small impeller 55 has been installed in the annular space between the inner diameter of end plate 39 and the friction clutch hub to encourage the influx of cooling oil during locked-wheel stall. When this stall maneuver occurs, the wheels are locked, which means the friction plate is not rotating, although the shaft 11, hub 19, cover 25, end plate 39 and pressure plate 43 continue to rotate. The cooling oil jet may well be striking a space between clutch plate holes 54 and not only failing to get to the far side of the friction plate, but rebounding so vigorously that the oil doesn't even cool the near side of the friction plate. As the impeller 55 is still rotating although the clutch plate is stationary, the cooling oil strikes the impeller vanes 58 and is broken up and disbursed on both sides of the clutch plate 46 to flow past the friction surfaces through the grooves therein and cool the clutch plate, end plate and pressure plate.

Although shown and described as a starting clutch for a continuously variable transmission, it is obvious that this clutch can be utilized in other transmission arrangements where a starting clutch is necessary or desirable.

We claim:

1. A starting clutch adapted to engage upon a signal from a throttle induced system oil pressure to couple a constantly rotating driving shaft with a driven concentric sleeve shaft, comprising a first hub operatively connected to rotate with said driving shaft, a clutch cover secured to said hub and having an axial flange portion, said hub having an annular pressure chamber formed therein receiving an axially reciprocable annular piston, an annular seal in said chamber behind said piston, a balance cap operatively connected on said hub forming a balance chamber in front of said piston, a clutch plate carrying friction facings, a second hub operatively connected to said sleeve shaft and secured to the clutch plate, an end plate operatively connected to said axial flange portion, an axially reciprocable pressure plate operatively connected to rotate with said axial flange portion, a Belleville spring pivotally mounted in said cover, a pressure disc extending generally radially between said piston and Belleville spring, said Belleville spring being actuated by said piston and pressure disc to engage said pressure plate and urge it against the clutch plate located between the pressure plate and end plate, a plurality of retractor spring fingers formed as one piece with said pressure disc engaging said pressure plate at its inner periphery to retract said pressure plate, and a source of hydraulic pressure communicating with said pressure chamber.

2. A starting clutch as set forth in claim 1, in which indented flattened ribs are formed in the axial flange portion circumferentially spaced therearound, and said pressure plate and end plate have complementary flattened channels in the peripheries thereof conformably receiving said ribs.

3. A starting clutch as set forth in claim 2, including a snap ring received in a groove adjacent the outer end of the cover flange to retain the end plate therein.

4. A starting clutch as set forth in claim 1, in which said cover has a corner at the inner end of the axial flange, and a snap ring is located in a groove spaced from said corner, the periphery of said Belleville spring being located between the corner and snap ring and fulcrumed therebetween.

5. A starting clutch as set forth in claim 1, wherein said balance cap extends radially inwardly over the open end of said balance chamber to trap fluid therein.

6. A starting clutch as set forth in claim 5, in which said piston includes at least one passage between said pressure chamber behind the piston and said balance chamber to provide fluid therein.

7. A starting clutch as set forth in claim 6, including means in said piston passage limiting flow therethrough, said fluid in said balance chamber counteracting the centrifugal force acting on the fluid in said pressure chamber.

8. A starting clutch as set forth in claim 1, wherein said retractor springs fingers extend axially within the inner peripheries of said Belleville spring and pressure plate to engage an inner lip on the pressure plate.

9. A starting clutch adapted to engage upon a signal from a throttle induced system oil pressure to couple a constantly rotating driving shaft with a driven concentric sleeve shaft, comprising a first hub operatively connected to rotate with said driving shaft, a clutch cover secured to said hub and having an axial flange portion, said hub having an annular pressure chamber formed therein receiving an axially reciprocable annular piston, an annular seal in said chamber behind said piston, at least two projections on said piston projecting through said annular seal to secure the piston and seal together, a balance cap operatively connected on said hub forming a balance chamber in front of said piston, a clutch plate carrying friction facings, a second hub operatively connected to said sleeve shaft and secured to the clutch plate, an end plate operatively connected to said axial flange portion, an axially reciprocable pressure plate operatively connected to rotate with said axial flange portion, a Belleville spring pivotally mounted in said cover, a pressure disc extending generally radially between said piston and Belleville spring, said Belleville spring being actuated by said piston and pressure disc to engage said pressure plate and urge it against the clutch plate located between the pressure plate and end plate, a plurality of retractor spring fingers integral with said pressure disc engaging said pressure plate at its inner periphery to retract said pressure plate, and a source of hydraulic pressure communicating with said pressure chamber.

10. A starting clutch as set forth in claim 9, wherein said annular seal has inner and outer sealing lips engaging the walls of said pressure chamber.

11. A starting clutch as set forth in claim 9, wherein at least one of said projections includes a passage therethrough communicating between the pressure and balance chambers.

* * * * *